US006543574B1

(12) United States Patent
Mizone et al.

(10) Patent No.: US 6,543,574 B1
(45) Date of Patent: Apr. 8, 2003

(54) METHOD OF MAKING A SPEAKER EDGE CONTAINING ISOCYANATE AND POLYOL

(75) Inventors: Sinya Mizone, Mie (JP); Shinya Kaneko, Aichi (JP); Kiyosi Ikeda, Mie (JP); Hiroko Yamasaki, Mie (JP)

(73) Assignees: Inoac Corporation, Aichi (JP); Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,075

(22) PCT Filed: Mar. 6, 2000

(86) PCT No.: PCT/JP00/01335

§ 371 (c)(1),
(2), (4) Date: Jan. 17, 2001

(87) PCT Pub. No.: WO00/54555

PCT Pub. Date: Sep. 14, 2000

(30) Foreign Application Priority Data

Mar. 9, 1999 (JP) .......................................... 11-061879

(51) Int. Cl.[7] .......................... G01K 13/00; H04R 7/00
(52) U.S. Cl. ........................ 181/171; 181/172; 381/392
(58) Field of Search ................................ 181/171, 172, 181/167, 168, 169, 170; 381/386, 392, 426, 428; 264/331.11–331.19, 328.1–328.16

(56) References Cited

U.S. PATENT DOCUMENTS

| | | | | |
|---|---|---|---|---|
| 5,111,510 A | * | 5/1992 | Mitobe | 181/172 |
| 5,650,105 A | * | 7/1997 | Yocum | 264/252 |
| 6,171,534 B1 | * | 1/2001 | Leach et al. | 264/102 |
| 6,224,801 B1 | * | 5/2001 | Mango, III | 264/154 |

FOREIGN PATENT DOCUMENTS

| | | | | |
|---|---|---|---|---|
| JP | 55074297 A | * | 6/1980 | H04R/07/20 |
| JP | 56-23097 | | 3/1981 | H04R/7/02 |
| JP | 63/286098 | | 11/1988 | H04R/7/20 |
| JP | 07312798 A | * | 11/1995 | H04R/07/20 |
| JP | 8/33095 | | 2/1996 | H04R/7/20 |
| JP | 09187097 A | * | 7/1997 | H04R/07/20 |
| JP | 09307991 A | * | 11/1997 | H04R/07/20 |
| JP | 10025327 A | * | 1/1998 | C08G/18/42 |
| JP | 11008897 A | * | 1/1999 | H04R/07/20 |

OTHER PUBLICATIONS

International Search Report.
Abstract JP56023097 Mar. 4, 1981.
Abstract JP63286098 Nov. 22, 1988.
Patent Abstract of Japan 08–033095 Feb. 2, 1996.

* cited by examiner

*Primary Examiner*—Robert E. Nappi
*Assistant Examiner*—Edgavdo San Martin
(74) *Attorney, Agent, or Firm*—Sughrue Mion, PLLC

(57) ABSTRACT

It is an object of the present invention to provide a speaker edge which is high in strength, less in scattering of $f_0$, high in waterproofness, small in amplitude at the time of resonance, easy to mold, and easy to be integrated with a cone body.

That is, the present invention provides a speaker edge constituted by a molding which is molded in a manner so that a speaker edge raw material composition containing isocyanate and polyol is injected into a cavity of a mold by an agitating/mixing apparatus and subjected to reaction, foaming and curing in the cavity.

11 Claims, 4 Drawing Sheets

METHOD OF MAKING A SPEAKER EDGE CONTAINING ISOCYANATE AND POLYOL

TECHNICAL FIELD

The present invention relates to a speaker edge at the circumferential edge of a cone body (also referred to as a "speaker diaphragm body").

BACKGROUND ART

In a speaker having a general configuration, as shown in FIG. 5, a cone body 50 composed of cone paper is retained on a frame F through a speaker edge 60 which is provided at the circumferential edge of the cone body, so that the cone body 50 is not prevented from vibrating. Incidentally, in order to not prevent the cone body 50 from vibrating, this speaker edge 60 is shaped so that a bent portion 65, bent upward or downward with a sectionally arc shape, is formed between an inner circumferential edge 61 and an outer circumferential edge 63.

In the background art, as such a speaker edge, there are: a speaker edge formed in such a manner that a foamed rubber composition is molded in a mold; a speaker edge formed in such a manner that molten resin of thermoplastic resin, for example, acrylic resin, polycarbonate resin, thermoplastic polyurethane resin, or the like, is injection-molded in a mold where a cone body is disposed; a speaker edge formed in such a manner that foamed polyurethane slavstock formed into a block by foam molding is cut out into a sheet with a predetermined thickness, and the foamed polyurethane sheet is shaped into the form of a speaker edge by heat compression with a press die; and so on.

However, the background-art speaker edges have problems as follows. First, in the speaker edge formed in such a manner that a foamed rubber composition is molded in a mold cavity, there is a problem that it is so heavy that the mass of a vibration system becomes heavy when the speaker edge is used in adhesion to a cone body. As a result, the sound pressure-frequency characteristic deteriorates. In addition, in the rubber speaker edge, there is another problem that high technology is required for bonding the speaker edge with a cone body.

In addition, in the speaker edge formed by injection molding out of molten thermoplastic resin, there is a problem that the temperature of the molten resin is about 200 to 300° C. which is so high that a cone body is apt to be damaged by heat when the speaker edge is molded integrally with the cone body in a mold.

In addition, in the speaker edge formed in such a manner that a slab of foamed polyurethane is cut out into a sheet and the foamed polyurethane sheet is molded by heat compression (hereinafter abbreviated to "slab cut-out heat compression molding"), the outer sides (convex sides) of bent base portions 66 and 67 shown in FIG. 5 are extended on a larger scale at the time of heat compression by press molding so as to be low in density, while the opposite inner sides (concave sides) are compressed so as to be high in density. The state of density of such an uneven surface results in deterioration of strength. Thus, the speaker edge is not preferable in view of durability or the like. Particularly, in the speaker edge, the inner circumferential side of the speaker edge 60 vibrates together with the circumferential edge of the cone body 50, while the outer circumferential side of the speaker edge 60 is bound on the frame F. As a result, fatigue is concentrated on the frame-side bent base portion 67. Thus, in the speaker edge formed by slab cut-out heat compression molding, the strength of the bent base portion is not sufficient.

In addition, the above-mentioned foamed urethane sheet is cut out of a slab so as to have an even thickness, and molded by heat compression. Accordingly, there is a problem that a required portion of the speaker edge cannot be made to have an optimum thickness, for example, the bent base portions 66 and 67 where the strength is lowered in the above-mentioned compression molding cannot be thickened to enhance the strength.

In addition, the above-mentioned foamed urethane slab cannot help the fact that the density differs from one portion to another when the slab is foamed and produced. Thus, the foamed polyurethane sheet cut out of the slab differs in density from one cut-out position thereof to another. As a result, there is a problem that the speaker edge formed out of the cut-out foamed polyurethane sheet by heat compression molding varies widely in the lowest resonance frequency $f_0$ of the speaker so that the quality is hardly fixed. When the scattering of $f_0$ was measured in practice, it was ±15 Hz at N=100.

Further, in a speaker, or the like, which is disposed in a door of a car, waterproofness is required of the speaker edge. However, since the above-mentioned foamed polyurethane slab has such a property that water penetrates from the surface, there is a problem that the speaker edge formed by slab cut-out heat compression molding is also inferior in waterproofness. In order to solve this problem of waterproofness, there has been also proposed a speaker edge coated with fluororesin. Also in this speaker edge coated with fluororesin, however, since the coating has an open-cell cellular structure, it is not practical to coat the speaker edge thick enough to close aperture portions. It is therefore impossible to say that the waterproofness is ensured sufficiently. In addition, there is a problem that the cost increases.

In addition, in the above-mentioned speaker edge formed by slab cut-out heat compression molding, as shown in the expanded schematic view of FIG. 6 which shows a section of an edge, the vicinity of a surface 65*a* is compressed at the time of heat compression molding, so that a hard and high-density skin layer 68 in which each cell H has been collapsed is formed through a clear boundary surface 68*a* between the skin layer 68 and a foamed layer 69 inside the skin layer 68. Thus, since the physical properties change clearly and suddenly, the amplitude in resonance increases so that an undesired phenomenon is produced.

Taking the foregoing problems into consideration, it is an object of the present invention to provide a speaker edge which is high in strength, less in scattering of $f_0$, high in waterproofness, small in amplitude in resonance, easy to mold, reliable and easy to be integrated with a cone body.

SUMMARY OF THE INVENTION

According to the present invention, there is provided a speaker edge constituted by a molding which is molded in a manner so that a speaker edge raw material composition containing isocyanate and polyol is injected into a cavity of a mold by an agitating/mixing apparatus and subjected to reaction, foaming and curing the mold. The speaker edge raw material composition to be used for casting according to the present invention may be used in combination of ones suitably selected from formula systems applied for various purposes as polyurethane raw material compositions. So-called soft hot mold formula systems which are known, semi-rigid cold mold formula systems, or formula systems suitable for mechanical froth meatbod may be applied to molding.

(2) Further, the present invention is characterized in that the speaker edge raw material composition is injected into the molding cavity in which a cone body is disposed, and the speaker edge molded by reaction, foaming and curing of the raw material composition is bonded integrally with the cone body by chemical reaction at the time of the reaction, foaming and curing.

(3) Further, the present invention is characterized in that a composition having viscosity in a range of from 100 cps to 100,000 cps at room temperature immediately after mixing is used as the speaker edge raw material composition.

(4) Further, the present invention is characterized in that the polyol is composed of a mixture of polyether polyol and polypolyester polyol.

(5) Further, the present invention is characterized in that cell inside the speaker edge is composed of only closed cells or both closed and open cells.

(6) Further, the present invention is characterized in that a surface of the speaker edge is composed of a skin layer to which a mold surface of the mold is transferred.

(7) Further, the present invention is characterized in that the skin layer of the surface is formed integrally with an inside foamed layer without any clear boundary surface lying therebetween.

(8) Further, the present invention is characterized in that density in thin base portions of a bent portion is higher than that in other thick portions.

(9) Further, the present invention is characterized in that density of the speaker edge is in a range of from 0.15 g/cm$^3$ to 0.9 g/cm$^3$.

Figure 1:
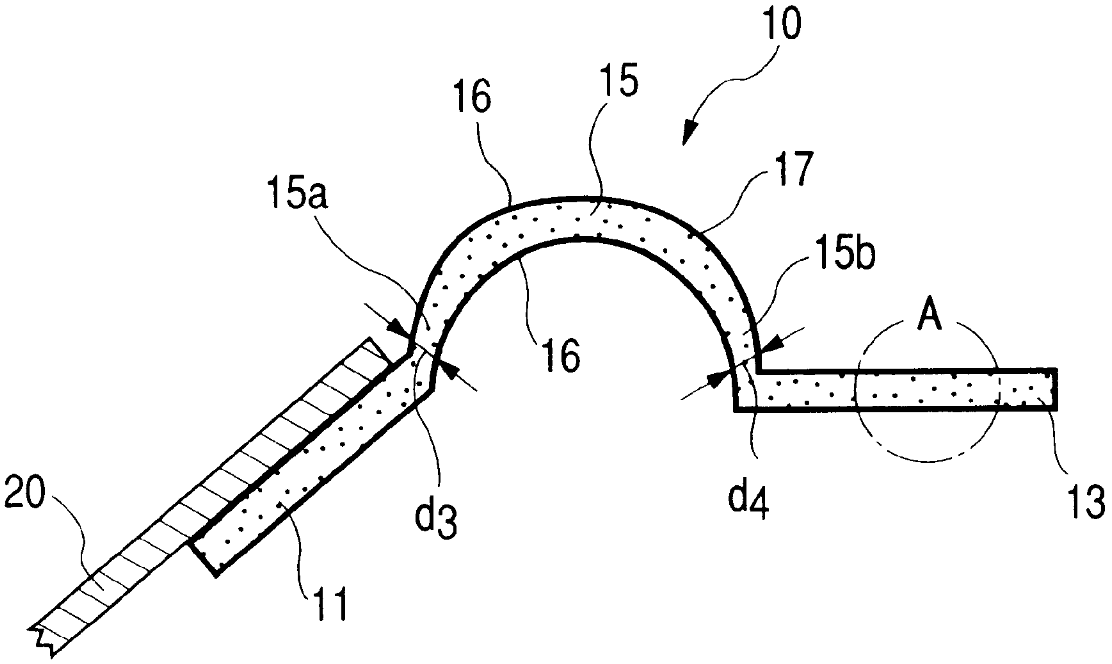
FIG. 1 is a main portion sectional view of a speaker edge according to an embodiment of the present invention.

Incidentally, in the drawings, the reference numeral 10 represents a speaker edge; 11, an inner circumferential edge of the speaker edge; 13, an outer circumferential edge of the speaker edge; 15, a bent portion; 15*a* and 15*b*, thin base portions of the bent portion; 16, a skin layer; 17, a foamed layer; 20, a speaker cone body; 40, a mold; 41, an upper mold; 42, a lower mold; 43, a cone body space; 44, an edge cavity; N, a nozzle of an agitating/mixing apparatus; and P, a raw material composition.

THE BEST MODE FOR CARRYING OUT THE INVENTION

The present invention will be described below in detail with reference to the accompanying drawings.

Figure 2:
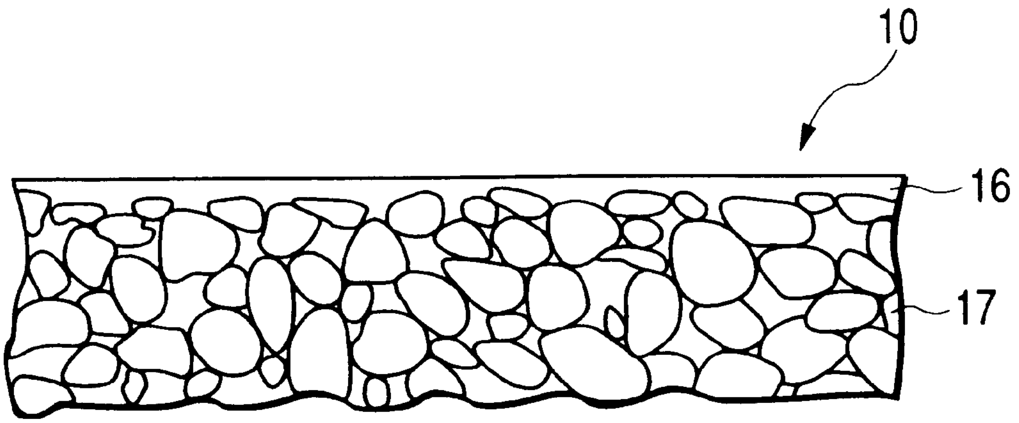
FIG. 2 is a schematic view showing a portion A of FIG. 1 in enlargement.
Figure 3:
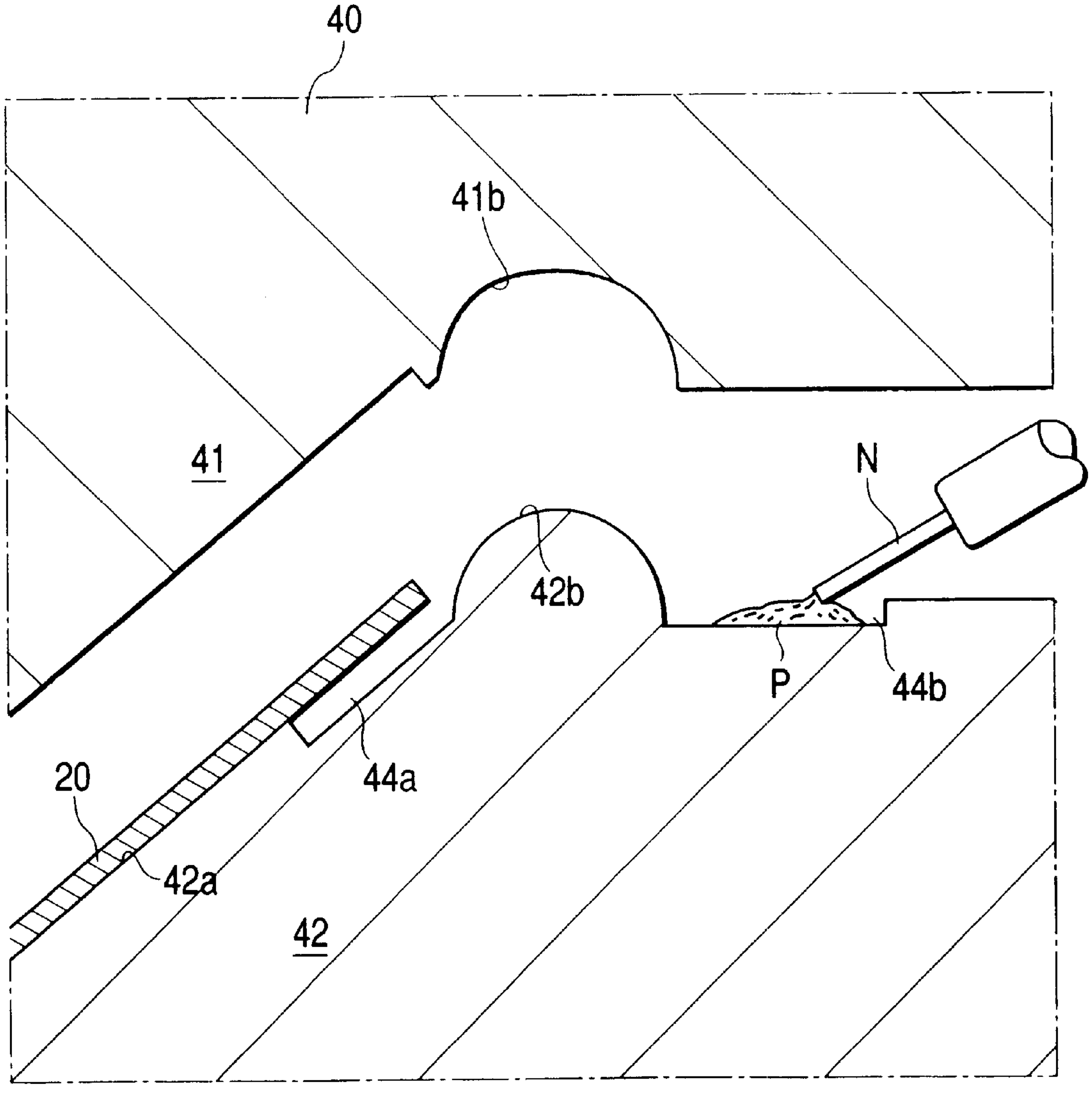
FIG. 3 is a partially sectional view of a mold when the speaker edge according to the present invention is molded.
Figure 4:
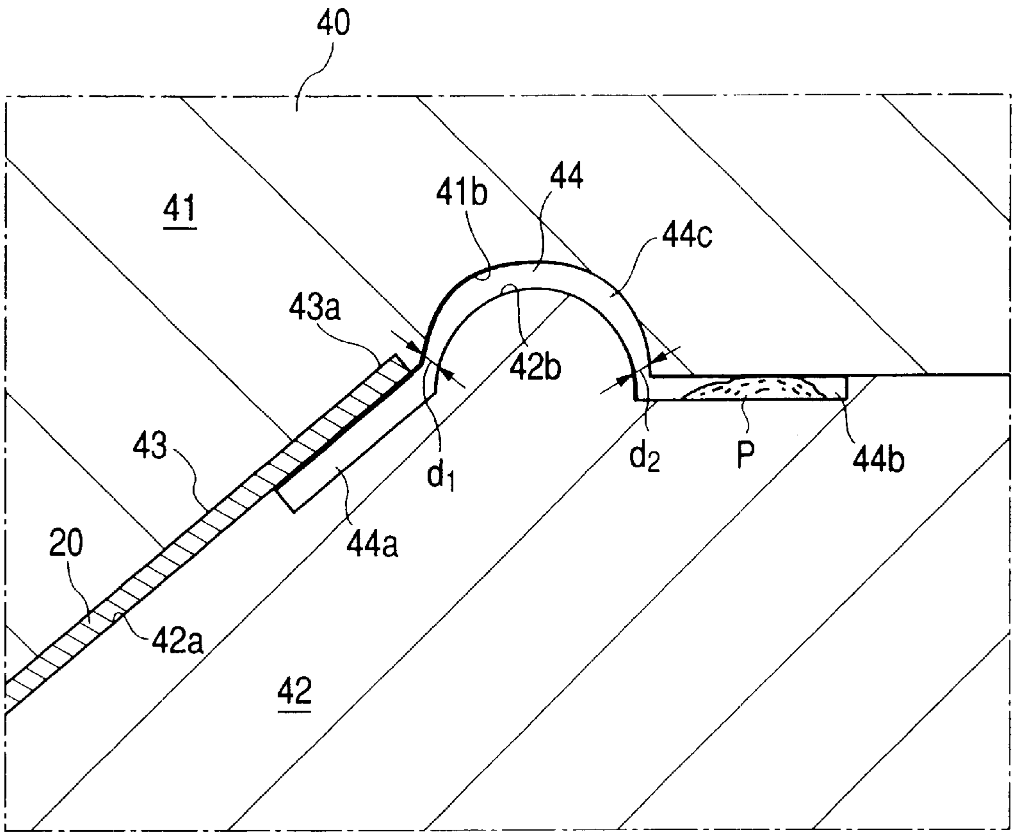
FIG. 4 is a partially sectional view of the mold when the mold is closed.

FIG. 1 is a partially sectional view of a speaker edge according to an embodiment of the present invention. FIG. 2 is an expanded schematic view showing a portion A of FIG. 1. FIGS. 3 and 4 are partially sectional views of a mold when the speaker edge according to the present invention is molded.

Figure 5:
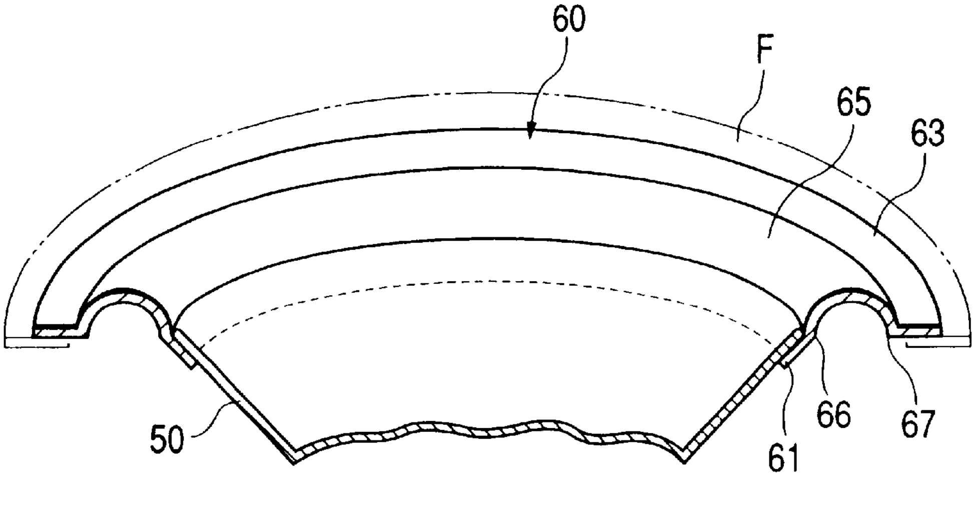
FIG. 5 is a partially cutaway perspective view of a speaker cone.

In the same manner as the speaker edge in FIG. 5 described in the above paragraph of Background Art, a speaker edge 10 according to an embodiment of the present invention shown in FIGS. 1 and 2 is constituted by an annular shape in which a bent portion 15 bent in a sectionally arc shape on one surface side of the speaker edge 10 is formed between an inner circumferential edge 11 and an outer circumferential edge 13. As shown in FIGS. 3 and 4, a speaker edge raw material composition P containing isocyanate and polyol is cast into a lower mold 42 of a mold 40 through a nozzle N of an agitating/mixing apparatus. After the mold is closed thereafter, the raw material composition P is subjected to reaction, foaming and curing in the mold 40. Thus, the speaker edge 10 is molded. At that time, it is preferable that a cone body 20 is disposed in the mold 40 in advance, and the inner circumferential edge 11 of the speaker edge 10 is bonded integrally with the circumferential edge of the speaker cone 20 by chemical reaction when the raw material composition P is subjected to reaction, foaming and curing. In such a manner, the work of bonding the speaker edge 10 with the cone body 20 becomes unnecessary. In addition, the isocyanate component of the raw material composition P reacts with a hydroxyl group of cellulose contained in cone paper composing the cone body 20, or a polar functional group formed on the cone paper surface by surface treatment using corona treatment, plasma treatment, or the like, in the case of PP cone paper. Thus, the cone body 20 and the speaker edge 10 are bonded with each other firmly.

As the raw material composition P, polyurethane raw material which contains isocyanate and polyol is used. As the isocyanate, aliphatic or aromatic polyisocyanate containing two or more isocyanate groups, a mixture of those polyisocyanates, or modified polyisocyanate obtained by modifying those polyisocyanates, may be used. As the aliphatic polyisocyanate, there can be listed hexamethylene diisocyanate, isophorone diisocyanate, dicyclohexamethane diisocyanate, etc. As the aromatic polyisocyanate, there can be listed toluene diisocyanate, diphenylmethane diisocyanate, naphthalene diisocyanate, xylylene diisocyanate, polymeric polyisocyanate (crude MDI), etc. Other prepolymers may be used.

As the polyol, polyether polyol or polypolyester polyol may be used. Particularly, a mixture of polyether polyol and polypolyester polyol shows superior physical properties such as waterproofness, antiweatherability, and so on. Therefore, such a mixture is suitable for the speaker edge according to the present invention.

As the polyether polyol, there can be listed polyalcohol such as ethylene glycol, diethylene glycol, polypropylene glycol, dipolypropylene glycol, butylene glycol, neopentyl glycol, glycerin, pentaerythritol, trimethylolpropane, sorbitol, sucrose, etc.; or polyether polyol in which alkylene oxide such as ethylene oxide, propylene oxide, or the like, is added to such polyalcohol.

On the other hand, as the polypolyester polyol, it is possible to use polypolyester polyol obtained by the polycondensation of aliphatic carboxylic acid such as malonic acid, succinic acid, adipic acid or the like, or aromatic carboxylic acid such as phthalic acid or the like, and aliphatic glycol such as ethylene glycol, diethylene glycol, polypropylene glycol or the like, etc. Alternatively, polymer polyol obtained in such a manner that an ethylenic unsaturated compound is polymerized in polyether polyol or polypolyester polyol, may be used.

The above-mentioned raw material composition P contains a catalyst, a foaming agent and other additives appropriately as well as isocyanate and polyol. As the catalyst, tertiary amines such as triethylenediamine, triethylamine, N-methylmorpholine, N,N-dimethylethanolamin, etc. or tin compounds such as stannous octoate, dibutyltin dilaurate, etc. may be used individually or in combination.

As the foaming agent, water and hydrocarbon such as pentane or the like may be used individually or in combination. In the case of water, carbon dioxide gas is generated when the raw material composition makes a reaction, and foaming is attained by the carbon dioxide gas.

As the other additives, there is a foam stabilizer. As the foam stabilizer, there can be listed a silicon foam stabilizer, a fluorine compound containing foam stabilizer, and a known surface active agent. Besides, a crosslinker, a filler, a coloring agent, etc. may be added appropriately.

In addition, it is preferable that the viscosity of the raw material composition P is in a range of from 100 cps to 100,000 cps at room temperature (20° C.). The raw material composition P having viscosity in this range has a high flowability even if it is not put at a high liquid temperature as molten thermoplastic resin at the time of injection molding. Accordingly, it becomes easy to inject the raw material composition P into the lower mold 42, so that the curved portion inside the mold 40 can be filled with the raw material composition P evenly when the raw material composition P reacts and foams. Thus, the speaker edge 10 with good quality is obtained. In addition, it becomes easy to impregnate the speaker cone body 20 with the raw material composition P, so that the speaker cone body 20 and the speaker edge 10 are bonded with each other more firmly.

The mold 40 is constituted by upper and lower molds 41 and 42 in this embodiment, or constituted by a split mold divided into a larger number of molds. In the mold 40, a cone body space 43, where the cone body 20 is disposed, and an edge cavity 44, one end side of which is put on a circumferential edge 43*a* of the cone body space, are formed. The edge cavity 44 is formed into an annular shape corresponding to the shape of the speaker edge. In this embodiment, a bent portion cavity 44*c* bent upward in a sectionally arc shape is formed between a flat inner circumferential edge cavity 44*a* and an outer circumferential edge cavity 44*b*. The bent portion cavity 44*c* is formed so that thicknesses $d_1$ and $d_2$ of the opposite end base portions thereof are thinner than the thicknesses of the other portions of the bent portion cavity 44*c*, the inner circumferential edge cavity 44*a* and the outer circumferential edge cavity 44*b*. Therefore, in the speaker edge 10 molded with this mold 40, thicknesses $d_3$ and $d_4$ of base portions 15*a* and 15*b* on the opposite ends of the bent portion 15 thereof become thinner than any other portion.

As shown in FIG. 3, the cone body 20 is disposed on a molding surface 42*a* of the cone body space in the lower mold 42 of the mold 40 which is opened, and the inner circumferential edge cavity 44*a* of the above-mentioned edge cavity 44 is located under the circumferential edge of the cone body 20. In addition, the front end of the injection nozzle N of the agitating/mixing apparatus (not shown) is disposed above a molding surface 42*b* of the edge cavity 44 on the outer circumference of the cone body 20 in the lower mold 42. A predetermined amount of the raw material composition P is injected, through the injection nozzle N, onto the mold surface 42*b* of the edge cavity in the lower mold 42. The agitating/mixing apparatus is an apparatus for agitating and mixing the raw material composition P and injecting it, and a known agitating/mixing apparatus for polyurethane foaming/molding is used therefor.

The raw material composition P injected onto the mold surface 42*b* of the edge cavity in the lower mold 42 expands smoothly due to the above-mentioned high flowability caused by the low viscosity. After the mold is closed, the raw material composition P foams due to successive reaction so as to fill the edge cavity 44. After that, the raw material composition P is cured and formed into the above-mentioned speaker edge 10 having a surface shape to which the mold surface of the edge cavity 44 has been transferred. Then, this speaker edge 10 is extracted from the mold 40. The density of the speaker edge 10 can be substantially fixed by fixing the injection quantity of the raw material composition P. Thus, the scattering of the above-mentioned $f_0$ is reduced.

Usually the temperature of the raw material composition P is set in a range of from about 10° C. to about 70° C. and the mold temperature of the mold 40 is set in a range of from 20° C. to 80° C. Therefore, there is no fear that the cone body 20 in the mold 40 is damaged by intense heat. In addition, the isocyanate of the raw material composition P chemically reacts with "—OH" introduced onto the surface of the cone body 20 so as to exhibit an adhesive property. Thus, the speaker edge 10 and the cone body 20 are bonded integrally with each other firmly.

Figure 6:
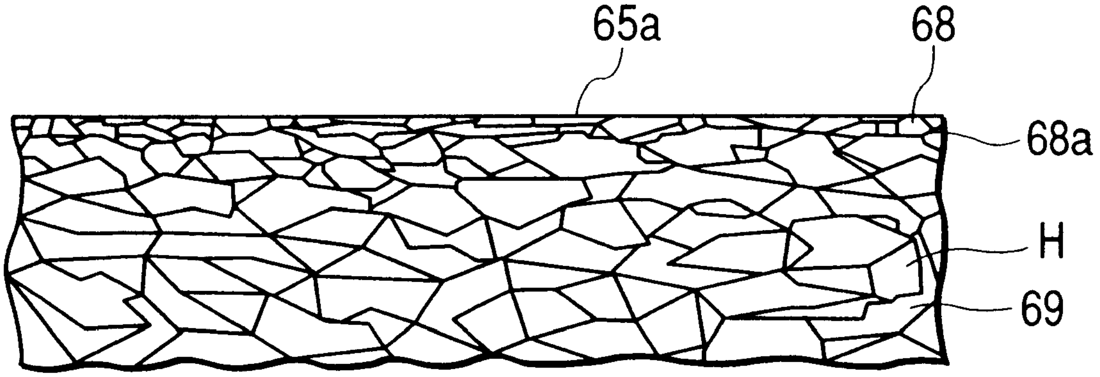
FIG. 6 is a schematic view showing a sectional structure of a speaker edge composed of a slab cut-out heat compression molding.

In addition, when the raw material composition P foams to fill the edge cavity 44, the raw material composition P comes in contact with the mold surface near the mold surface 41*b* and 42*b* in the edge cavity 44 so that the heat at the time of reaction is lost. Thus, cells does not grow up, and the resin is cured. As a result, as shown in the schematic view of FIG. 2, a fine skin layer 16 is formed on the surface of the speaker edge 10. This skin layer 16 has no pin hole on the surface, and the density thereof is higher than that of a foamed layer 17 inside the speaker edge 10. In addition, this skin layer 16 is continuously integrated with the foamed layer 17 without any clear boundary surface between the skin layer 16 and the foamed layer 17 located inside the skin layer 16 while the boundary surface 68*a* exists between the skin layer 68 and the foamed layer 69 in the case where a foamed urethane sheet is molded by heat compression as shown in FIG. 6 in the background art. Therefore, there is no fear that the amplitude increases at the time of resonance. In addition, the thickness of the skin layer 16 formed thus is hardly affected by the local thickness change of the edge cavity 44, that is, the thickness change of the speaker edge 10. Thus, the skin layer 16 has enough thickness even in the thin base portions 15*a* and 15*b* at the opposite ends of the above-mentioned bent portion 15. As a result, the thin base portions 15*a* and 15*b* of the bent portion 15 have enough strength so that there is no fear that the thin base portions 15*a* and 15*b* of the bent portion 15 are broken even if the speaker is used for a long time. Further, in the thin base portions 15*a* and 15*b* of the bent portion 15, though the skin layer 16 has almost the same thickness as the other thick portions, the thickness of the inner foamed layer 17 is thinner than any other thick portion. Accordingly, the thin base portions 15*a* and 15*b* have higher density than any other thick portion, so that the strength is enhanced.

In addition, waterproofness is given to the speaker edge 10 by the skin layer 16 on the surface thereof. Further, if the cell structure in the inner foamed layer 17 is composed of only closed cells or both closed cells and open cells, the waterproofness becomes higher. Incidentally, in order to compose the cell out of only closed cells or increase the ratio of closed cells, polyfunctional polyol is used as the polyol in the above-mentioned raw material composition P, and a foam stabilizer with high activity is selected.

It is more preferable that the density of the speaker edge 10 as a whole is set in a range of from 0.15 g/cm$^3$ to 0.9 g/cm$^3$ so that the mass of the vibration system is not made heavy and there is no fear that the sound pressure-frequency characteristic deteriorates. Such adjustment of the density can be attained easily by adjusting the injection quantity of the raw material composition P injected into the mold 40 or additives thereto such as a foaming agent, etc.

EXAMPLES

Speaker edges according to the embodiments of the present invention were molded by use of raw material compositions shown below, and they were measured as to total density, density of the bent base portion, density of the thick portion, a cellular state, a skin layer state, scattering of the lowest resonance frequency $f_0$, and waterproofness. In addition, speaker edges composed of slab cut-out heat compression moldings as comparative examples were measured as to a skin layer state, scattering of $f_0$, and waterproofness. The results are shown in Table 1.

[Measuring Method]

Total density (g/cm$^3$): The total density was measured according to JIS K 6401.

Density of bent thin base portion and density of thick portion (g/cm$^3$): The density of the bent thin base portion and the densities of the inner and outer circumferential edges as thick portions were measured according to JIS K 6401.

Cellular state: Magnified by 100 times with a microscope, only closed cells or the ratio of closed cells to open cells were measured visually.

Skin layer state: Magnified by 100 times with a microscope, the existence of a clear boundary surface was judged visually.

Scattering of $f_0$ (Hz): 100 speaker edges each of which was bonded with a cone body which was 25.7 mm in voice coil diameter, 106 mm in cone body outer diameter and 2.1 g in weight, were manufactured, and the lowest resonance frequency $f_0$ was measured upon each of the speaker edges.

Waterproofness: A cone in which a speaker edge was bonded with a cone body (mica reinforced propylene injection molded cone body with waterproofness) which was 25.7 mm in voice coil diameter, 106 mm in cone body outer diameter and 2.1 g in weight, were manufactured. In the state where this cone was made to lie prone, the outer circumference of the speaker edge was fixedly bonded with the bottom of a glass vessel closely. Water was put into the vessel, and the state of water leakage from the speaker edge inside the cone was judged visually.

[Molding Method]

By use of the mold 40 with the cone body space 43 and the edge cavity 44 shown in FIGS. 3 and 4, the cone body 20 molded beforehand was disposed on the mold surface of the cone body space 43. After that, the raw material composition was injected so that the speaker edge 10 in FIG. 1 was molded into a 14 cm-speaker roll edge shape which was 4 mm in roll diameter, 107 mm in roll inner diameter, 125 mm in roll outer diameter, 6.4 mm in total roll height, and 0.6 mm in molding thickness. Incidentally, the roll portion designates the sectionally arc bent portion 15 in FIG. 1. As the cone body (diaphragm), a mica reinforced propylene injection molded body which was 106 mm in cone body outer diameter, 25.7 mm in voice coil diameter, and 2.1 g in weight, was used.

[Recipe of Raw Material Composition and Molding Conditions]

Example 1

Isocyanate: Crude MDI, MR-200, made by Nippon Polyurethane Industry Co., Ltd. 28.0 parts by weight Polyol: Polyether polyol, CP4701, made by The Dow Chemical Company 100.0 parts by weight Blowing agent: Water (distilled water) 0.6 parts by weight Crosslinker: Glycerin 2.0 parts by weight Catalyst: 33% dipropylene glycol solution of triethylenediamine, DABCO-33LV, made by Sankyo Air Products Co., Ltd. 1.0 parts by weight Foam stabilizer: Silicon foam stabilizer L5305, made by Union Carbide Corp 1.0 parts by weight Viscosity of raw material composition at 20° C.: 150 cps Injection temperature and quantity of raw material composition: 25° C., 3 g

Example 2

Isocyanate: Toluene diisocyanate, TDI-80 40.0 parts by weight

Polyol: Polyether polyol, CP4701, made by The Dow Chemical Company 100.0 parts by weight Foaming agent:Water (distilled water) 3.0 parts by weight Crosslinker: Glycerin 2.0 parts by weight Catalyst: Octyl tin 0.1 parts by weight 33% dipropylene glycol solution of triethylenediamine, DABCO-33LV 0.2 parts by weight Foam stabilizer: silicone foam stabilizer L5305, made by Union Carbide Corp 1.0 parts by weight Viscosity of raw material composition at 20° C.: 5,000 cps Injection temperature and quantity of raw material composition: 25° C., 3 g

Example 3

Isocyanate: Blend of TDI-80 and crude MDI in the ratio of 60:40, made by Nippon Polyurethane Industry Co., Ltd. 30.0 parts by weight Polyether polyol: PPG-3000, made by Sanyo Chemical Industries, Ltd. 50.0 parts by weight Polypolyester polyol: F-3010, made by KURARAY CO., LTD. 50.0 parts by weight Foaming agent: Water (distilled water) 2.4 parts by weight Crosslinker: Dipropylene glycol 20.0 parts by weight Catalyst: N,N-dimethylaminomethanol, made by Nippon Nyukazai Co., Ltd. 0.5 parts by weight Foam stabilizer: Hydroxyl group containing polyalkyl siloxane copolymer, SH-193, made by Toray Silicone Co., Ltd. 1.0 parts by weight Viscosity of raw material composition at 20° C.: 10,000 cps Injection temperature and quantity of raw material composition: 25° C., 3 g

Comparative Example

A sheet with a thickness of 7 mm and a density of 0.025 g/cm$^3$ cut out of a soft slab foam was molded into a roll edge shape which was 4 mm in roll diameter, 107 mm in roll inner diameter, 125 mm in roll outer diameter, 6.4 mm in total roll height, and 0.6 mm in molding thickness, by hot press molding. Incidentally, the hot press was performed on the conditions that the mold temperature was 210±5° C. and the total pressure was 1 ton.

TABLE 1

| physical properties | Example 1 | Example 2 | Example 3 | Comparative Example |
|---|---|---|---|---|
| total density (g/cm$^3$) | 0.2 | 0.4 | 0.7 | — |
| density of | 0.3 | 0.6 | 0.8 | — |

TABLE 1-continued

| physical properties | Example 1 | Example 2 | Example 3 | Comparative Example |
|---|---|---|---|---|
| bent thin base portion (g/cm$^3$) | | | | |
| density of thick portion (g/cm$^3$) | Inner circumferen-tial edge 0.12 | inner circumferen-tial edge 0.2 | inner circumferen-tial edge 0.35 | — |
| | Outer circumferen-tial edge 0.12 | outer circumferen-tial edge 0.2 | outer circumferen-tial edge 0.35 | — |
| cellular state | Communi-cating | half-communi-cating | half-communi-cating | — |
| state of skin layer | thin film | thick film | thick film | nothing |
| Scattering of $f_0$ (Hz) | 100 ± 6 | 95 ± 7 | 90 ± 5 | 100 ± 15 |
| Waterproofness (time) | over 24 hours | Over 24 hours | over 24 hours | several seconds |

INDUSTRIAL UTILIZATION

As has been described above, in a speaker edge relating to every one of the above-mentioned inventions (1) to (9) according to the present invention, a raw material composition containing isocyanate and polyol is injected into a mold so as to be molded. Accordingly, the speaker edge is light in weight in comparison with a speaker edge composed of rubber, the mass of a vibration system does not increase in weight, and there is no case that the sound pressure-frequency characteristic deteriorates. Further, the speaker edge according to the present invention is molded by the reaction, foaming and curing of the raw material composition in the mold. Accordingly, the surface state and the inner cellular state are not uneven as in a background-art speaker edge formed by cutting a foamed polyurethane slab into a sheet and molding the sheet by heat compression. Thus, there is no case that the strength is lowered due to such unevenness.

Further, as in the above-mentioned invention (2) according to the present invention, in a speaker edge in which a speaker cone body is disposed in a mold and a raw material composition containing isocyanate and polyol is injected into the mold so that the speaker edge is bonded with the cone body by chemical reaction at the time of the reaction, foaming and curing of the raw material composition, the work of bonding the speaker edge and the cone body with each other is not required as another work. In addition, the speaker edge and the cone body are bonded with each other firmly, so that there is an effect that the durability is superior. In addition, the temperature of the raw material composition containing isocyanate and polyol and the mold temperature are much lower than the temperature of molten thermoplastic resin at the time of injection molding. Accordingly, there is no fear that the cone body is damaged by heat.

In the above-mentioned invention (3) according to the present invention, the viscosity of the raw material at 20° C. is in a range of from 100 cps to 100,000 cps. Accordingly, the raw material composition is superior in flowability in the mold so that the quality of the speaker edge molded in the mold is fixed and superior. In addition, it is possible to obtain enough flowability even if the raw material composition is not set at a high temperature when the raw material composition is injected into the mold. Therefore, in the speaker edge molded integrally with the cone body in the mold, there is no fear that the cone body is not damaged by the heat of the raw material composition. Further, the viscosity of the raw material composition is so low that the cone body is easily impregnated with the raw material composition. Accordingly, the speaker edge and the cone body is bonded with each other more firmly.

Moreover, in the above-mentioned invention (4) according to the present invention, if polyol is made of a mixture of polyether polyol and polypolyester polyol, it is possible to obtain a speaker edge which is more excellent in quality.

Further, in the above-mentioned invention (5) according to the present invention, if the cellular state inside the speaker edge is composed of only closed cells or both closed cells and open cells, the waterproofness of the speaker edge can be enhanced.

In the above-mentioned invention (6) according to the present invention, the speaker surface is constituted by a skin layer to which the mold surface of the mold is transferred. Accordingly, there is an effect that the speaker edge is superior in waterproofness and strength. In addition, the skin layer on the surface does not fall into an uneven state where foam is compressed as in the background-art speaker edge formed by cutting out a foamed polyurethane slab into a sheet and molding the sheet by heat compression. Accordingly, there is no fear that the strength is lowered.

In the above-mentioned invention (8) according to the present invention, the density in thin base portions of a bent portion is higher than that in other thick portions. Accordingly, the strength of the thin base portions of the bent portion, which is apt to be fatigued when the speaker cone body vibrates, becomes sufficient.

Further, in the above-mentioned invention (9) according to the present invention, the density of the speaker edge is in a range of from 0.15 g/cm$^3$ to 0.9 g/cm$^3$ so that the speaker edge is superior in lightweight property. Accordingly, the mass of a vibration system does not become heavy. As a result, there is no fear that the sound pressure-frequency characteristic deteriorates, and superior tone quality can be obtained.

What is claimed is:

1. A speaker edge comprising a molding which is molded by:

injecting a speaker edge raw material composition containing isocyanate and polyol into a cavity of a mold by an agitating/mixing apparatus; and subjecting the speaker edge raw material to reaction, foaming and curing in the cavity, wherein a composition having viscosity in a range of from 100 cps to 100,000 cps at room temperature immediately after mixing is used as the speaker edge raw material composition.

2. The speaker edge according to claim 1, wherein the speaker edge raw material composition is injected into the molding cavity in which a cone body is disposed, and the speaker edge molded by reaction, foaming and curing of the raw material composition is bonded integrally with the cone body by chemical reaction at the time of the reaction, foaming and curing.

3. The speaker edge according to claim 1, wherein the polyol is composed of a mixture of polyether polyol and polypolyester polyol.

4. The speaker edge according to claim 1, wherein cell inside the speaker edge is composed of only closed cells or both closed and open cells.

5. The speaker edge according to claim 1, wherein the skin layer of the surface is formed integrally with an inside foamed layer without any clear boundary surface lying therebetween.

6. A speaker edge comprising a molding which is molded by:

injecting a speaker edge raw material composition containing isocyanate and polyol into a cavity of a mold by an agitating/mixing apparatus; and subjecting the speaker edge raw material to reaction, foaming and curing in the cavity, wherein density in thin base portions of a bent portion is higher than that in other thick portions.

7. A speaker edge comprising a molding which is molded by:

injecting a speaker edge raw material composition containing isocyanate and polyol into a cavity of a mold by an agitating/mixing apparatus; and subjecting the speaker edge raw material to reaction, foaming and curing in the cavity, wherein density of the speaker edge is in a range of from 0.15 $g/cm^3$ to 0.9 $g/cm^3$.

8. A speaker edge comprising a molding which is molded by:

injecting a speaker edge raw material composition containing isocyanate and polyol into a cavity of a mold by an agitating/mixing apparatus; and subjecting the speaker edge raw material to reaction, forming and curing in the cavity;

wherein a surface of the speaker edge is composed of a skin layer to which a mold is transferred, wherein a composition having viscosity in a range of from 100 cps to 100,000 cps at room temperature immediately after mixing is used as the speaker edge raw material composition.

9. The speaker edge according to claim 8, wherein the skin layer of the surface is formed integrally with an inside foamed layer without any clear boundary surface lying therebetween.

10. A speaker edge comprising a molding which is molded by:

injecting a speaker edge raw material composition containing isocyanate and polyol into a cavity of a mold by an agitating/mixing apparatus; and subjecting the speaker edge raw material to reaction, forming and curing in the cavity;

wherein a surface of the speaker edge is composed of a skin layer to which a mold is transferred, wherein density in thin base portions of a bent portion is higher than that in other thick portions.

11. A speaker edge comprising a molding which is molded by:

injecting a speaker edge raw material composition containing isocyanate and polyol into a cavity of a mold by an agitating/mixing apparatus; and subjecting the speaker edge raw material to reaction, forming and curing in the cavity;

wherein a surface of the speaker edge is composed of a skin layer to which a mold is transferred, wherein density of the speaker edge is in a range of from 0.15 $g/cm^3$ to 0.9 $g/cm^3$.

* * * * *